(12) United States Patent
Simonsson et al.

(10) Patent No.: US 10,469,223 B2
(45) Date of Patent: Nov. 5, 2019

(54) WIRELESS NODE, RADIO NODE AND METHODS FOR TRANSMITTING AND RECEIVING A REFERENCE SIGNAL

(71) Applicant: Telefonaktiebolaget LM Ericsson (publ), Stockholm (SE)

(72) Inventors: Arne Simonsson, Gammelstad (SE); David Astely, Bromma (SE); Sara Sandberg, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 42 days.

(21) Appl. No.: 15/551,183

(22) PCT Filed: Feb. 19, 2015

(86) PCT No.: PCT/SE2015/050189
§ 371 (c)(1),
(2) Date: Aug. 15, 2017

(87) PCT Pub. No.: WO2016/133437
PCT Pub. Date: Aug. 25, 2016

(65) Prior Publication Data
US 2018/0041317 A1    Feb. 8, 2018

(51) Int. Cl.
*H04L 5/00*      (2006.01)
*H04W 72/04*   (2009.01)
(Continued)

(52) U.S. Cl.
CPC .......... *H04L 5/0048* (2013.01); *H04B 7/024* (2013.01); *H04B 7/0456* (2013.01); *H04W 72/044* (2013.01); *H04B 7/046* (2013.01)

(58) Field of Classification Search
None
See application file for complete search history.

(56) References Cited

U.S. PATENT DOCUMENTS

| | | | |
|---|---|---|---|
| 10,044,422 B2 * | 8/2018 | Moulsley | H04B 7/024 |
| 2007/0195900 A1 * | 8/2007 | Lee | H04B 1/712 |
| | | | 375/260 |

(Continued)

FOREIGN PATENT DOCUMENTS

WO    2011099908 A1    8/2011

OTHER PUBLICATIONS

International Search Report and Written Opinion dated Sep. 16, 2015 for International Application Serial No. PCT/SE2015/050189, International Filing Date: Feb. 19, 2015 consisting of 16-pages.

*Primary Examiner* — Faruk Hamza
*Assistant Examiner* — Cassandra L Decker
(74) *Attorney, Agent, or Firm* — Patent Portfolio Builders, PLLC (57) ABSTRACT

A method in a first wireless node for transmitting a reference signal is provided. The first wireless node operates in a wireless communications network. The first wireless node transmits the reference signal from at least two transmit antennas of the first wireless node. The reference signal is transmitted with a phase between the at least two transmit antennas indicating a desired phase related to radio conditions for reception of a transmission from a first radio node at the first wireless node. The reference signal is to be received and taken into account by one or more other radio nodes in the wireless communications network, e.g. when scheduling transmissions to other wireless nodes.

22 Claims, 7 Drawing Sheets

(51) Int. Cl.
*H04B 7/0456* (2017.01)
*H04B 7/024* (2017.01)

(56) References Cited

U.S. PATENT DOCUMENTS

| | | | | |
|---|---|---|---|---|
| 2007/0222677 | A1* | 9/2007 | Strong | H04B 7/0626 342/367 |
| 2010/0027697 | A1* | 2/2010 | Malladi | H04B 7/0417 375/260 |
| 2011/0200018 | A1* | 8/2011 | Tazeh Mahalleh | H04L 5/001 370/336 |
| 2011/0249665 | A1* | 10/2011 | Seyama | H04L 27/2646 370/350 |
| 2012/0275411 | A1 | 11/2012 | Kim et al. | |
| 2012/0315859 | A1* | 12/2012 | Lee | H04J 11/005 455/67.13 |
| 2013/0058380 | A1* | 3/2013 | Kim | H04W 76/14 375/146 |
| 2013/0114559 | A1* | 5/2013 | Fujimoto | H04W 72/04 370/329 |
| 2013/0182671 | A1* | 7/2013 | Kakishima | H04B 7/0417 370/329 |
| 2013/0250876 | A1* | 9/2013 | Hugl | H04W 24/10 370/329 |
| 2014/0112168 | A1 | 4/2014 | Chen et al. | |
| 2015/0155988 | A1* | 6/2015 | Papasakellariou | H04W 72/042 370/329 |
| 2015/0236773 | A1* | 8/2015 | Kim | H04B 7/0626 375/295 |
| 2016/0183275 | A1* | 6/2016 | Inoue | H04B 7/0695 455/450 |
| 2016/0226647 | A1* | 8/2016 | Wang | H04L 5/0057 |
| 2017/0230160 | A1* | 8/2017 | Li | H04L 5/0048 |

* cited by examiner

WIRELESS NODE, RADIO NODE AND METHODS FOR TRANSMITTING AND RECEIVING A REFERENCE SIGNAL

CROSS-REFERENCE TO RELATED APPLICATIONS

This application is a Submission Under 35 U.S.C. § 371 for U.S. National Stage Patent Application of International Application Number: PCT/SE2015/050189, filed Feb. 19, 2015 entitled "WIRELESS NODE, RADIO NODE AND METHODS FOR TRANSMITTING AND RECEIVING A REFERENCE SIGNAL," the entirety of which is incorporated herein by reference.

TECHNICAL FIELD

Embodiments herein relate to a wireless node, a radio node and a methods therein. In particular, it relates to transmitting, by the wireless node, a reference signal and receiving the reference signal at the radio node.

BACKGROUND

Terminals for communication are also known as e.g. User Equipments (UE), mobile terminals, wireless terminals and/or mobile stations. The terminals, herein also denoted wireless nodes, are enabled to communicate wirelessly in a cellular communications network, sometimes also referred to as a cellular radio system or cellular network, or other wireless communications network or system. The communication may be performed e.g. between two terminals, between a terminal and a regular telephone and/or between a terminal and a server via a Radio Access Network (RAN) and possibly one or more core networks, comprised within the cellular communications network.

Terminals may further be referred to as mobile telephones, cellular telephones, laptops, or surf plates with wireless capability, just to mention some further examples. The terminals in the present context may be, for example, portable, pocket-storable, hand-held, computer-comprised, or vehicle-mounted mobile devices, enabled to communicate voice and/or data, via the RAN, with another entity, such as another terminal or a server.

The cellular communications network covers a geographical area which is divided into cell areas, wherein each cell area is served by a base station, e.g. a Radio Base Station (RBS), which sometimes may be referred to as e.g. eNodeB (eNB), NodeB, B node, Base Transceiver Station (BTS), or AP (Access Point), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. Further, each base station may support one or several communication technologies. The base stations communicate over the air interface operating on radio frequencies with the terminals within range of the base stations. The base stations and terminals involved in communication may also be referred to as transmitter-receiver pairs, where the respective transmitter and receiver in a pair may refer to a base station or a terminal, depending on the direction of the communication. In the context of this disclosure, the expression Downlink (DL) is used for the transmission path from the base station to the mobile station. The expression Uplink (UL) is used for the transmission path in the opposite direction i.e. from the mobile station to the base station.

Universal Mobile Telecommunications System (UMTS) is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for terminals. The 3GPP has undertaken to evolve further the UTRAN and GSM based radio access network technologies.

In 3rd Generation Partnership Project (3GPP) Long Term Evolution (LTE), base stations, which may be referred to as eNodeBs or even eNBs, may be directly connected to one or more core networks.

3GPP LTE radio access standard has been written in order to support high bitrates and low latency both for uplink and downlink traffic. All data transmission in LTE is controlled by the radio base station.

In a hierarchical telecommunications network the backhaul portion of the network comprises the intermediate links between the core network, or backbone network, and the small sub networks at the "edge" of the entire hierarchical network.

In wireless communication systems, co-channel interference is one of the main factors that limits the capacity of the wireless communication system. There exists several approaches for dealing with the interference in multi-user scenarios, which require different levels of coordination among the transmitters. Interference Alignment (IA) is one such technique which can mitigate the interference between transmitter-receiver pairs. Another approach is interference suppression in a receiver.

The basic idea behind IA is that the multiple transmitters seek to align the caused interference to unintended receivers within a minimum dimension subspace, so that at each receiver the remaining dimensions can be used for interference-free communication. The minimum dimension of the interference subspace depends among other things on the number of transmit antennas. The more transmit antennas, the more options are there to align the interference. This allows each receiver to eliminate all the interference by simply canceling everything that falls into this subspace. This is a rather general idea, in the sense that the signals can be aligned in any given dimension, such as time, frequency, or space. There are also several possible ways to specify and implement IA algorithms, depending on the cost function to be optimized and on the degree of coordination.

In a conventional cellular system, as an example, only the intra-cell interference is mitigated. When there exists coordination between different cells such as in a Coordinated Multi-Point (CoMP) system, the interference between cells, i.e. inter-cell interference, can be canceled by using techniques such as joint transmission. Joint transmission requires tight coordination between the transmitters and that the transmitted streams are shared among the transmitters. However, when it is not possible to perform a joint transmission, such as in the case of loose coordination, then IA would be a suitable candidate for canceling the inter-cell interference.

Other interference avoiding techniques are evolved such as Minimum Mean Squared Error (MMSE) based IA which reduces the interference subspace rather than completely aligning all interference. The interference subspace is defined herein as the signal subspace of the interfering signals.

Interference suppression in a receiver is dependent on the number of receiver antennas and receiver implementation. Different wireless nodes, e.g. UEs, may have different interference suppression capability and performance dependent on receiver and antenna design.

In practice it is difficult to coordinate all transmissions to achieve interference alignment. To give substantial gain, large clusters of cells need to be coordinated and the transmitters need to be equipped with a large number of antennas. The co-ordination also needs to be done with short delay requiring very good backhaul.

Further, the wireless node receiver implementation is typically not specified by standard (3GPP, IEEE nor others) but left open for vendors to enable continuous improvement. Receivers including interference suppression can be implemented in different ways, for example by Maximum Ratio Combining (MRC), MMSE or zero forcing. For a given received signal direction and phase, the different solutions will be capable of suppressing interference unequally good and will also differ in robustness for interference from different directions and with different phases. This results in that best phase for interference reception differ between different UE vendors and even between different versions of UEs from the same UE vendor. The impact from receiver suppression and UE or wireless node implementation is therefore difficult to take into account when applying interference alignment, as receiver implementation, capability to suppress interference and best known reception phase in the wireless node may be unknown to a radio node such as a base station scheduling transmissions that may generate interference to the wireless node. There is thus a need for solutions that facilitate interference alignment in a wireless communications network.

SUMMARY

It is therefore an object of embodiments herein to provide a way of improving the performance in a wireless communications network by facilitating interference alignment in the wireless communications network. A further object of embodiments herein is to improve the possibility to make use of varying capabilities for mitigating interference in wireless nodes communicating with radio nodes in the wireless communications network for interference alignment in the wireless communications network. Yet another object of embodiments herein is to improve the possibility to schedule transmissions to wireless nodes in the wireless communications network while limiting interference to other wireless nodes caused by the transmissions by making use of capabilities for mitigating interference in wireless nodes communicating with radio nodes in the wireless communications network.

According to a first aspect of embodiments herein, the object is achieved by a method performed in a first wireless node for transmitting a reference signal. The first wireless node operates in a wireless communications network. The first wireless node transmits the reference signal from at least two transmit antennas of the first wireless node. The reference signal is transmitted with a phase between the at least two transmit antennas indicating a desired phase related to radio conditions for reception of a transmission from a first radio node at the first wireless node.

The reference signal is to be received and taken into account by one or more other radio nodes in the wireless communications network.

According to a second aspect of embodiments herein, the object is achieved by a method performed in a second radio node for receiving a reference signal from a first wireless node. The second radio node operates in a wireless communications network. The second radio node receives in at least two receive antennas of the second radio node, the reference signal from the first wireless node. The received reference signal has a phase indicating a desired phase related to radio conditions for reception of a transmission from a first radio node at the first wireless node.

According to a third aspect of embodiments herein, the object is achieved by a first wireless node for transmitting a reference signal, which first wireless node is configured to operate in a wireless communications network. The first wireless node is configured to transmit the reference signal from at least two transmit antennas of the first wireless node. The reference signal is to be transmitted with a phase between the at least two transmit antennas indicating a desired phase related to radio conditions for reception of a transmission from a first radio node at the first wireless node.

The reference signal is to be received and taken into account by one or more other radio nodes in the wireless communications network.

According to a fourth aspect of embodiments herein, the object is achieved by a second radio node for receiving a reference signal from a first wireless node. The second radio node is configured to operate in a wireless communications network. The second radio node is configured to receive in at least two receive antennas of the second radio node, the reference signal from the first wireless node. The received reference signal has a phase indicating a desired phase related to radio conditions for reception of a transmission from a first radio node at the first wireless node.

Since the second radio node receives the reference signal with a phase indicating the desired phase related to radio conditions for reception of a transmission from a first radio node at the first wireless node, the second radio node may take the received phase indicating the desired phase into consideration when communicating with other wireless nodes in the wireless communications network and thereby cause less interference to the first wireless node receiving a transmission from a first radio node.

In this way the performance in the wireless communications network is improved.

An advantage with embodiments herein is that they will work also with less good backhaul, i.e. when there are longer delays in co-ordination between transmissions performed at distributed sites.

A further advantage with embodiments herein is that they provide a distributed scheme centred around each wireless node.

A yet further advantage with embodiments herein is that they enable MMSE IA and other more practical interference avoiding techniques.

BRIEF DESCRIPTION OF THE DRAWINGS

Examples of embodiments herein are described in more detail with reference to attached drawings in which.

DETAILED DESCRIPTION

Figure 1:
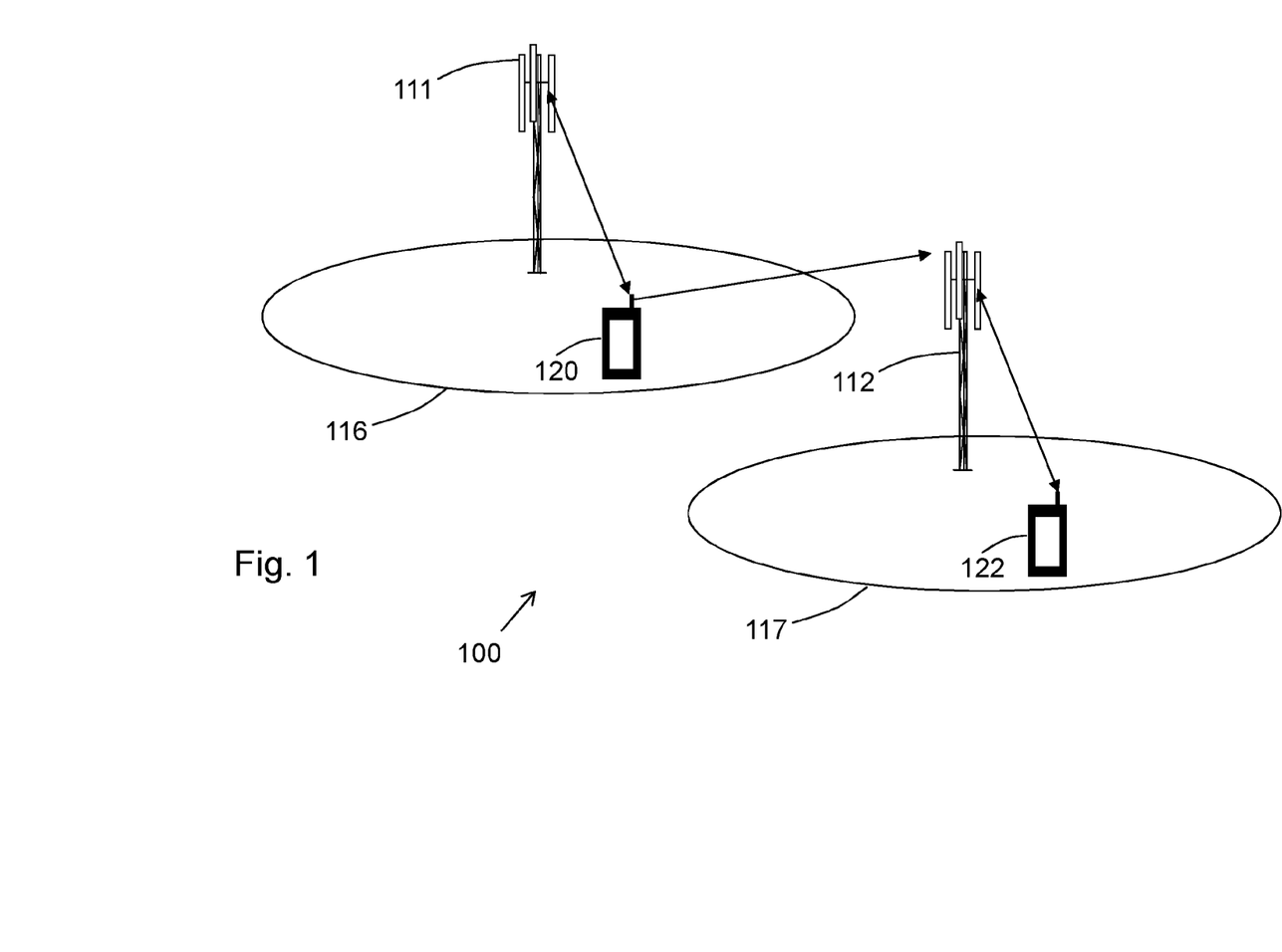
FIG. 1 is a schematic block diagram illustrating embodiments of a wireless communications network.

FIG. 1 depicts a wireless communications network 100 in which embodiments herein may be implemented. The wireless communications network 100 is a network using Time Divisional Duplex (TDD) such as a $5^{th}$ generation (5G) system or an enhanced 802.11 WLAN system, or any wireless communications network or system using TDD.

The wireless communication network 100 may also be a Frequency Division Duplex (FDD) system. With closely spaced antennas the FDD network characteristics are similar to those of a TDD network.

A plurality of radio nodes operate in the wireless communications network 100, whereof two, a first radio node 111, and a second radio node 112 are depicted in FIG. 1. The first radio node 111 may be referred to as a transmission point and may in some embodiments be a base station such as an eNB, an eNodeB, a Home Node B, a Home eNodeB, a pico base station or any other network node capable of communicating with a wireless node, such as a user equipment with wireless capability, or any other radio network unit capable of communicating over a radio link in a wireless communications network. In some embodiments, the first radio node 111 may even be a wireless node, such as a user equipment, with device to Device (D2D) capabilities. The first radio node 111 serves a first cell 116.

The second radio node 112 may also be referred to as a transmission point and may in some embodiments be a base station such as an eNB, an eNodeB, a Home Node B, a Home eNodeB or any other network node capable of communicating with a wireless node such as a user equipment with wireless capability, or any other radio network unit capable of communicating over a radio link in a wireless communications network. In some embodiments, the second radio node 112 may even be a wireless node, such as a user equipment, with device to Device (D2D) capabilities. The second radio node 112 serves a second cell 117. The second radio node 112 may be a neighbouring radio node to the first radio node 111.

A number of wireless nodes, in this example in form of user equipments, operate in the wireless communications network 100. In the example scenario of FIG. 1, only two wireless nodes are shown for simplicity, a first wireless node 120, also referred to as a first user equipment, located in the first cell 116 and a second wireless node 122, also referred to as a second user equipment, located in the second cell 117. The first wireless node 120 and the second wireless node 122 may e.g. be mobile or wireless terminals, wireless devices, mobile phones, computers such as e.g. laptops, or tablet computers, sometimes referred to as surf plates, with wireless capabilities, or any other radio network unit capable of communicating over a radio link in a wireless communications network. The terms wireless node and user equipment used in this document also cover other wireless terminals such as Machine to Machine (M2M) devices. In some embodiments the first wireless node 120 and/or second wireless node 122 may have D2D capabilities. In these embodiments, the first and/or second wireless nodes or user equipments may be capable of communicating with the first radio node 111 and second radio node 112 over D2D links, when the first and second radio nodes are represented by wireless nodes or user equipments with D2D capabilities.

According to embodiments herein each of the first wireless node 120 and the second wireless node 122 have equal number of transmit antennas and receive antennas.

Embodiments herein are e.g. applicable to a TDD system where the UE:s have equal number of transmit and receive antennas. This may be a 5G system such as a system of LTE New Carrier Type or millimeter-wave (mmWave) type, an enhanced 802.11 WLAN system or an LTE TDD system. The embodiment is also applicable to a FDD or TDD system where the transmit and receive antennas are closely spaced. Furthermore, for such FDD and TDD systems, having closely spaced antennas, the embodiments herein may further be applicable for unequal number of transmit antennas. The solution presented herein may further be applicable for systems applying different beam-forming capabilities between reception and transmission. If for example there are more reception antennas the beam may be more narrow for reception, but one can still transmit a bit wider beam with fewer transmit antennas indicating a desired or not desired interference direction.

According to embodiments herein, the first wireless node 120 transmits a reference signal such as an interference alignment sounding signal with a phase indicating a desired direction or phase for receiving interference or a phase indicating where the first wireless node 120 has a preferred signal reception phase for receiving transmissions from the first radio node 111. The transmitted phase of the reference signal thus indicates a desired phase related to radio conditions for reception of a transmission from the first radio node 111 at the first wireless node 120.

The transmitted reference signal is intended to be received by one or more other radio nodes in the wireless communications network 100, for example by the second radio node 112 of FIG. 1, in order to enable the one or more other radio nodes to take the radio conditions for signal reception of a transmission from the first radio node 111 at the first wireless node 120 into account when scheduling transmissions to other wireless nodes in the wireless communications network 100, for example the second wireless node 122 of FIG. 1. The one or more other radio nodes are enabled to take the radio conditions for reception of the transmission from the first radio node 111 at the first wireless node 120 into account by receiving the reference signal having a received phase that indicates the desired phase related to radio conditions for reception of a transmission from the first radio node 111 at the first wireless node 120 and taking the received phase of the reference signal into account when scheduling transmissions to other wireless nodes in the wireless communications network 100, for example the second wireless node 122 of FIG. 1.

The received phase of the reference signal indicates the desired phase related to radio conditions for reception of a transmission from the first radio node 111 at the first wireless node 120 in that the received phase is a resulting phase obtained by transmitting the reference signal with a phase indicating a desired phase related to radio conditions for reception of a transmission from the first radio node 111 at the first wireless node 120 to the one or more other radio nodes over a radio channel, whereby the received phase results from a combination of the transmitted phase and a channel phase imposed by the radio channel. The received phase conveys information about the desired phase because of reciprocity of the radio channel conditions, which means that the receiving one or more other radio nodes can use the received phase of the reference signal for determining how to schedule transmissions to other wireless nodes in the wireless communications network 100 in order to limit harmful interference on the transmission from the first radio node 111 to the first wireless node 120.

Depending on the respective directions of locations of the one or more other radio nodes relative to the direction of the location of the first radio node 111 from the first wireless node 120, the indicated desired phase may be a phase indicating where interference is desired or a phase indicating where the first wireless node 120 has a preferred signal reception phase for receiving transmissions from the first radio node 111, as mentioned above. This is because a radio node that is located closer to the same direction as the first radio node 111 from the first wireless node 120, or along a line extending from this direction, will be in a better position for receiving a reference signal transmitted with a phase indicating where the first wireless node 120 has a preferred signal reception phase for receiving transmissions from the first radio node 111 than for receiving a reference signal transmitted with a phase that indicates a desired interference phase or direction. Correspondingly, a radio node that is located closer to a direction perpendicular or orthogonal to the direction of the first radio node 111 from the first wireless node 120, or along a line extending from this direction, will be in a better position for receiving a reference signal transmitted with a phase that indicates a desired interference phase or direction than for receiving a reference signal transmitted with a phase indicating a preferred signal reception phase or direction of the first wireless node 120 for receiving transmissions from the first radio node 111. A phase indicating a preferred signal reception phase or direction of the first wireless node 120 for receiving transmissions from the first radio node 111 implicitly also indicates a desired interference phase or direction, as these directions or phases are orthogonal to each other. Depending on whether the indication of desired interference phase is implicit or explicit, the received phase of the received reference signal will be an implicit or explicit indication to the second radio node 112 of a phase or direction that can be used for data transmission to other wireless nodes, e.g. the second wireless node 122, without causing harmful interference to the first wireless node 120 receiving transmissions from the first radio node 111.

The desired phase may in some embodiments, additionally or alternatively, be related to a capability of the first wireless node 120 to suppress interference at reception of a transmission from the first radio node 111. For example, the desired phase may be determined by the first wireless node 120 taking into account the possibility to suppress interference.

According to some embodiments herein an interference sounding resource is specified for uplink transmission. This may in its simplest form be a global common resource for all wireless nodes or user equipments and all cells in the wireless communications network. The sounding may be sent by the wireless node when data reception is ongoing or scheduled. For example it may be allocated just before a downlink transmission slot enabling reception of the sounding, i.e. the reference signal in uplink, at the radio node before scheduling and precoding the downlink transmission.

Figure 2:
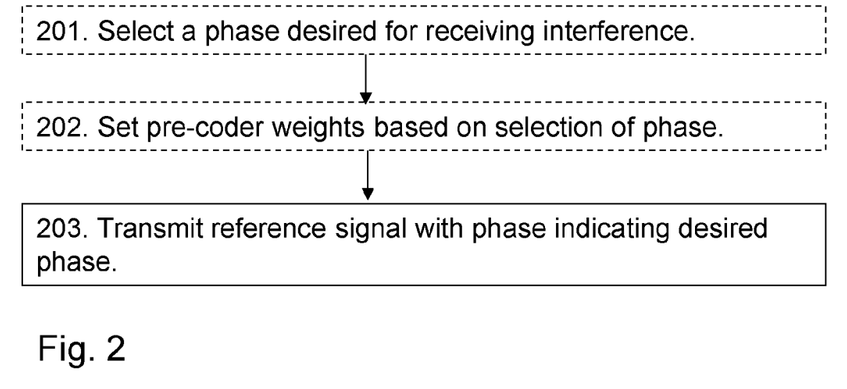
FIG. 2 is a flowchart depicting embodiments of a method in a wireless node.

Example embodiments of a method performed in the first wireless node 120, for transmitting a reference signal will now be described with reference to a flowchart depicted in FIG. 2. As mentioned above the first wireless node 120 operates in the wireless communications network 100.

The method comprises the following actions, which actions may be taken in any suitable order. Dashed lines of some boxes in FIG. 2 indicate that this action is not mandatory. The phase of the transmitted reference signal may be defined as a phase shift or phase difference between two antennas. If the transmitter and the receiver of the first wireless node 120 have more than two antennas, several phase shifts are considered to describe the desired phase. For example the signal transmitted from one antenna may be seen as the reference and the phase shifts of signals transmitted from other antennas may be calculated as the difference in phase between the signal transmitted from the reference antenna and the signal transmitted from the considered antenna.

When antennas are closely spaced, i.e. separated by less than a wavelength, and co-polarized, the phase shift forms a directive beam pointing in a geographical direction radially out from the transmitter and/or receiver. In such cases the radio nodes which may potentially cause most interference may best detect "preferred signal phase", i.e. a phase indicating where the first wireless node 120 has a preferred signal reception phase for receiving transmissions from the first radio node 111, whereas "desired interference phase", i.e. a phase indicating where interference is desired may be difficult to detect because the beam will point in another direction.

Action 201

Receiver configuration determined for the first wireless node 120, such as receiver weights and other receiver information may be used to select a desired phase $\varphi$ related to preferred radio conditions for signal reception at the first wireless node 120 such as e.g. a phase where interference is best mitigated and avoided for the first wireless node 120 or a phase where a data transmission from the first radio node 111 is best received. Thus in some embodiments, the first wireless node 120 selects the desired phase based on a receiver configuration determined for the wireless node 120.

The selection of the desired phase may further be based on a capability for interference cancellation of the receiver of the first wireless node 120. This may for example be the capability of the receiver of the first wireless node 120 to perform Interference Rejection Combining (IRC).

Action 202

A way to be able to transmit the reference signal with a phase indicating the desired phase $\varphi$ is by setting pre-coder weights to transmit in this phase $\varphi$. Thus, in some embodiments the first wireless node 120 sets pre-coder weights in accordance with the desired phase. That is, given a desired phase, or rather desired phase shifts between the signals transmitted from the antennas of the wireless node or user equipment, the pre-coder weights are adjusted to correspond to the desired phase shifts. The reference signal is typically a wideband signal covering the same frequency band as used for data transmissions.

Action 203

According to an example scenario, when the wireless node 120 is about to receive a transmission, e.g. a data transmission, from the first radio node 111, the wireless node 120 needs to inform one or more other radio nodes within radio coverage of the first wireless node 120, such as the second radio node 112, about the desired phase q related to radio conditions for reception of transmissions from the first radio node 111 at the first wireless node 120. The first wireless node 120 thus transmits a reference signal from at least two transmit antennas of the first wireless node 120. The reference signal is transmitted with a phase between the at least two transmit antennas indicating a desired phase related to radio conditions for reception of a transmission from the first radio node 111 at the first user equipment 120. The reference signal is to be received by one or more other radio nodes such as the second radio node 112 in the wireless communications network 100. The received reference signal is to be taken into account by the one or more other radio nodes in the wireless communications network 100, e.g. when scheduling transmissions to other wireless nodes.

In some embodiments the desired phase comprises at least one phase that is related to radio conditions for reception of a transmission from the first radio node 111 at the first wireless node 120 in that it is a phase where interference at reception of signals from the first radio node 111 is acceptable to the first wireless node 120. In these embodiments the interference is best mitigated and avoided for the first wireless node 120 in the indicated phase. Therefore the first wireless node 120 needs to inform the second radio node 112 and other radio nodes that may cause interference at the reception of the transmission from the first radio node 111, that the first wireless node 120 prefers to receive as much as possible of any generated interference in the selected indicated phase φ. The interference may e.g. be caused by the second radio node 112 when transmitting to any second wireless node 122 in the second cell 117.

Alternatively or additionally, the desired phase may comprise at least one phase that is related to radio conditions for reception of a transmission from the first radio node 111 at the first wireless node 120 in that it is a phase where the first wireless node 120 has a preferred signal reception phase that implicitly indicates a phase where interference at reception of signals from the first radio node 111 is acceptable to the first wireless node 120. In these embodiments the second radio node 112 should consider avoiding transmissions with the same phase as the received phase, that indicates the desired phase as explained earlier, in order to keep the signal received by the first wireless node 120 as free as possible from interference.

In an embodiment where the desired phase comprises more than one phase, for example a phase where the first wireless node 120 has a preferred signal reception phase as well as a phase where interference at reception of signals from the first radio node 111 is acceptable to the first wireless node 120, the transmitted reference signal may comprise more than one transmitted reference signal, for example so that a first reference signal is transmitted with a first phase indicating the desired phase where the first wireless node 120 has a preferred signal reception phase and a second reference signal is transmitted with a second phase indicating the desired phase where interference at reception of signals from the first radio node 111 is acceptable to the first wireless node 120. The first and second reference signals may be transmitted during different time slots, in different frequency bands or with different orthogonal codes.

The first wireless node 120 may set pre-coder weights in accordance with the desired phase by setting the precoder weights to scaled versions of Maximum Ratio Combining, (MRC) receiver weights. The precoding thereby exploits the duality property that a signal subspace with the least interference for a certain receiver is also the subspace that causes the least interference to other wireless nodes or user equipments during a reciprocal network transmission.

The transmitting of the reference signal may be turned on or off based on reception or based on scheduling information. The transmitting of the reference signal may be performed when data, e.g. downlink data, is to be received at the first wireless node 120. This is advantageous in that the second radio node 112 receives the reference signal having the phase indicating the desired phase just when the first wireless node 120 is about to receive data and wishes to receive interference, if any, in the desired phase. By transmitting the reference signal only when data is to be received, the second radio node 112 can select precoding to be used for interference alignment beneficial for first wireless node 120 currently receiving data.

At least one out of: an orthogonal code, a frequency and a transmission time slot of the reference signal may be specific to a cluster of cells comprising at least one cell 116 and common for wireless nodes, including the first wireless node 120, located in the cluster of cells. Similarly, at least one out of: an orthogonal code, a frequency and a transmission time slot of a reference signal used within a further cluster of cells comprising at least one cell 117 may be specific to the further cluster of cells and common for wireless nodes, including the second wireless node 122, located in the further cluster of cells. This allows the second radio node 112 to distinguish reference signals transmitted by wireless nodes or user equipments outside the further cluster of cells, e.g. the first wireless node 120, from reference signals transmitted by wireless nodes inside the further cluster of cells, e.g. the second wireless node 122.

In some alternative embodiments an orthogonal code, a frequency and a transmission time slot of the reference signal are common for wireless nodes in the wireless communications network 100. This is an advantage, since the time-frequency resources available for transmission of the reference signal are very limited.

The reference signal may indicate multiple desired phases related to radio conditions for reception of a transmission from the first radio node 111 at the first wireless node 120. For example, if the first wireless node 120 receives several streams of data, the reference signal may indicate desired phases related to preferred radio conditions for reception of a transmission from the first radio node 111 at the first wireless node 120 for each one of the streams. Multiple desired phases may be communicated for example through multiple reference signals transmitted during different time slots, in different frequency bands or with different orthogonal codes. Multiple desired phases may also be communicated to indicate that any interference that is a linear combination of signals with a desired phase is preferred by the first wireless node 120.

The transmitted power of the reference signal may indicate importance of interference avoidance. If the interference has a severe impact on reception quality at the receiver of the first wireless node 120, the reference signal may be transmitted with a higher power than if impact of the interference on the reception quality at the receiver of the first wireless node 120 is less severe. This enables the second radio node 112 to avoid transmissions generating interference to the first wireless node 120 suffering most from interference.

In this way a data transmission to any second wireless node 122 may be transmitted such that it generates interference to the first wireless node 120 in a direction implicitly or explicitly indicated by the desired phase. This will affect reception of a data transmission from the first radio node at the first wireless node 120 in a beneficial way e.g. by causing as little interference as possible to the first wireless node 120.

The reference signal may also be referred to as interference alignment sounding. The reference signal may be sent frequency selective based on frequency selective receiver weights and desired phases for different sub-bands. Frequency selective receiver weights are beneficial for reception in the specific sub-band and may differ between sub-bands due to frequency selective scheduling and the frequency dependencies of the channel. The desired phases for different sub-bands may preferably be selected based only on the interference situation in the current sub-band. Furthermore, the transmitting of the reference signal in a specific sub-band may be turned on or off based on reception or based on scheduling information specific for the sub-band.

Figure 3:
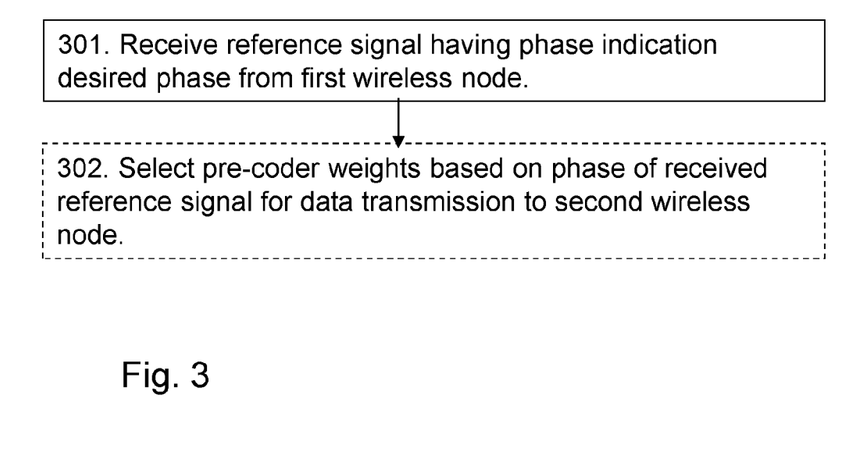
FIG. 3 is a flowchart depicting embodiments of a method in a radio node.

Example embodiments of a method performed in the second radio node 112 for receiving a reference signal from the first wireless node 120 will now be described with reference to a flowchart depicted in FIG. 3. As mentioned above the second radio node 112 operates in the wireless communications network 100.

The method comprises the following actions, which actions may be taken in any suitable order. Dashed lines of some boxes in FIG. 3 indicate that this action is not mandatory.

Action 301

The second radio node 112 receives in at least two receive antennas of the second radio node 112, a reference signal from at least one first wireless node 120. The received reference signal has a phase indicating a desired phase related to radio conditions for reception of a transmission from a first radio node 111 at the first wireless node 120. The received phase, i.e. the phase of the received reference signal, may be taken into account by the second radio node 112 when scheduling transmissions to other wireless nodes in the wireless communications network 100.

The desired phase may comprise at least one phase that is related to radio conditions for reception of a transmission from the first radio node 111 at the first wireless node 120 in that it is a phase where interference at reception of signals from the first radio node 111 is acceptable to the first wireless node 120. In these embodiments the interference is best mitigated and avoided for the first wireless node 120 in the desired phase and therefore the wireless node 120 prefers to receive as much as possible of interference in the selected desired phase.

In some further embodiments the desired phase may alternatively or additionally comprise at least one phase that is related to radio conditions for reception of a transmission from the first radio node 111 at the first wireless node 120 in that it is a phase where the first wireless node 120 has a preferred signal reception phase that implicitly indicates a phase where interference at reception of signals from the first radio node 111 is acceptable to the first wireless node 120. In these embodiments the second radio node 112 should consider avoiding transmissions with the same phase as the received phase, that indicates the desired phase as explained earlier, in order to keep the signal received by the first wireless node 120 as free as possible from interference.

As mentioned above, the desired phase may in some embodiments comprise more than one phase and the transmitted reference signal may comprise more than one transmitted reference signal. For example, a first reference signal may be transmitted with a first phase indicating the desired phase where the first wireless node 120 has a preferred signal reception phase and a second reference signal may be transmitted with a second phase indicating the desired phase where interference at reception of signals from the first radio node 111 is acceptable to the first wireless node 120. The first and second reference signals may be transmitted during different time slots, in different frequency bands or with different orthogonal codes.

In some embodiments, at least one out of: an orthogonal code, a frequency and a transmission time slot of the reference signal is specific to a cluster of cells comprising at least one cell, e.g. cell 116, and common for wireless nodes located in the cluster of cells. In these embodiments the second radio node 112 receives a sum of reference signals from wireless nodes transmitting the reference signal in the cluster of cells.

Thus the received sum of reference signals depends on which cluster the at least one wireless node 120 is comprised in. If the cluster comprises more than one wireless node, the phase indicating the desired phase from one wireless node will not be distinguishable from the phases indicating desired phases of the other wireless nodes in the same cluster. The interference to a specific wireless node may therefore not be possible to minimize, but by selecting precoder weights based on the phase of the sum of the reference signals, the average interference to the first wireless node 120 may be reduced and the overall interference to all wireless nodes in the cluster is minimized.

In some alternative embodiments, the orthogonal code, the frequency and the transmission time slot of the reference signal is common to wireless nodes in the wireless communications network 100. In these embodiments the second radio node 112 receives a sum of reference signals from wireless nodes transmitting the reference signal in the wireless communications network 100.

The reference signals received from wireless nodes, such as the second wireless node 122, connected to the second radio node 112 may be excluded or subtracted from the received sum of reference signals by excluding at least one out of: the orthogonal code, the frequency or the transmission time slot for the cell 117. Or, as an alternative, by subtracting known transmissions of the reference signal from wireless nodes in the cell 117. The transmitted reference signal is typically known at the serving radio node, e.g. the second radio node 112, through cell ID of the cell, e.g. cell 117. Assuming also that the channels between wireless nodes in the cell 117 and the second radio node 112 are known, the parts of the sum of the received reference signals that correspond to wireless nodes in the cell 117 may be subtracted. The remaining parts then only correspond to reference signals transmitted from wireless nodes outside cell 117. Typically, intra-cell interference is already avoided through scheduling on different time/frequency resources. The reference signal may therefore be used to limit the inter-cell interference.

The received power of the reference signal may indicate an importance of interference avoidance. The received power depends on the attenuation of the sounding depending on the distance and other radio conditions. Transmission from the first wireless node 120 further away will result in lower received power which also indicates that a transmission by the second radio node 112 will interfere the first wireless node 120 less. In case the sounding reference is transmitted by the first wireless node 120 with a power indicating the importance of interference avoidance this will also be included in the received power as received by the second radio node 112. The received power will then capture the importance as determined by the first wireless node 120 as well as the radio conditions resulting in caused interference.

Action 302

The second radio node 112 may then select pre-coder weights for a data transmission to the second wireless node 122 based on the phase of the received reference signal. As mentioned above, the phase of the received reference signal may, depending on whether the desired phase implicitly or explicitly indicates a desired interference phase, be an implicit or explicit indication to the second radio node 112 of a phase or direction that can be used for data transmission to other wireless nodes. The pre-coder weights for a data transmission to the second wireless node 122 may therefore be selected differently depending on whether the phase of the received reference signal implicitly indicates a desired phase where the first wireless node 120 has a preferred signal reception phase or explicitly indicates a desired phase where interference at reception of signals from the first radio node 111 is acceptable to the first wireless node 120.

Assuming that the desired phase is a phase where the first wireless node 120 has a preferred signal reception phase, the selection in the second radio node 112 of the pre-coder weights for the data transmission to the second wireless node 122 based on the phase of the received reference signal may comprise: Selecting pre-coder weights equal to receive weights selected for receiving a signal from the second wireless node 122 including interference cancellation.

When receiving the reference signal from the second wireless node 122 the interference from the first wireless node 120 shall be mitigated. If these selected receive weights are used as precoder weights to send the data transmission to the second wireless node 122, the interference affecting the first wireless node 120 is also taken into account weighted with the preferred phase for data transmission to the second wireless node 122.

In this way the data transmission to the second wireless node 122 transmitted in a direction indicated by the desired phase will affect a data transmission to the first wireless node 120 in an weighted way e.g. by limiting the interference to the first wireless node 120 at the same time as maintaining the signal strength to the second wireless node 122.

When many wireless nodes are transmitting sounding on the same orthogonal code and frequency this will minimize the overall caused interference to these wireless nodes. When orthogonal code, frequency or time used for reference signal transmission is specific for each cluster the second radio node 112 may sum the received signals for all these reference signals resulting in a total phase based on phases and strength before selecting precoder weights.

The selection of the pre-coder weights for the data transmission to the second wireless node 122 based on the phase of the received reference signal may comprise a weighting between:

selecting pre-coder weights according to reception conditions for the data transmission to the second wireless node 122, and selecting pre-coder weights based on the phase of the received reference signal, thereby causing less interference to the first wireless node 120.

The methods described above will now be explained and described more in detail and text below is applicable to any suitable embodiment described above.

Figure 4:
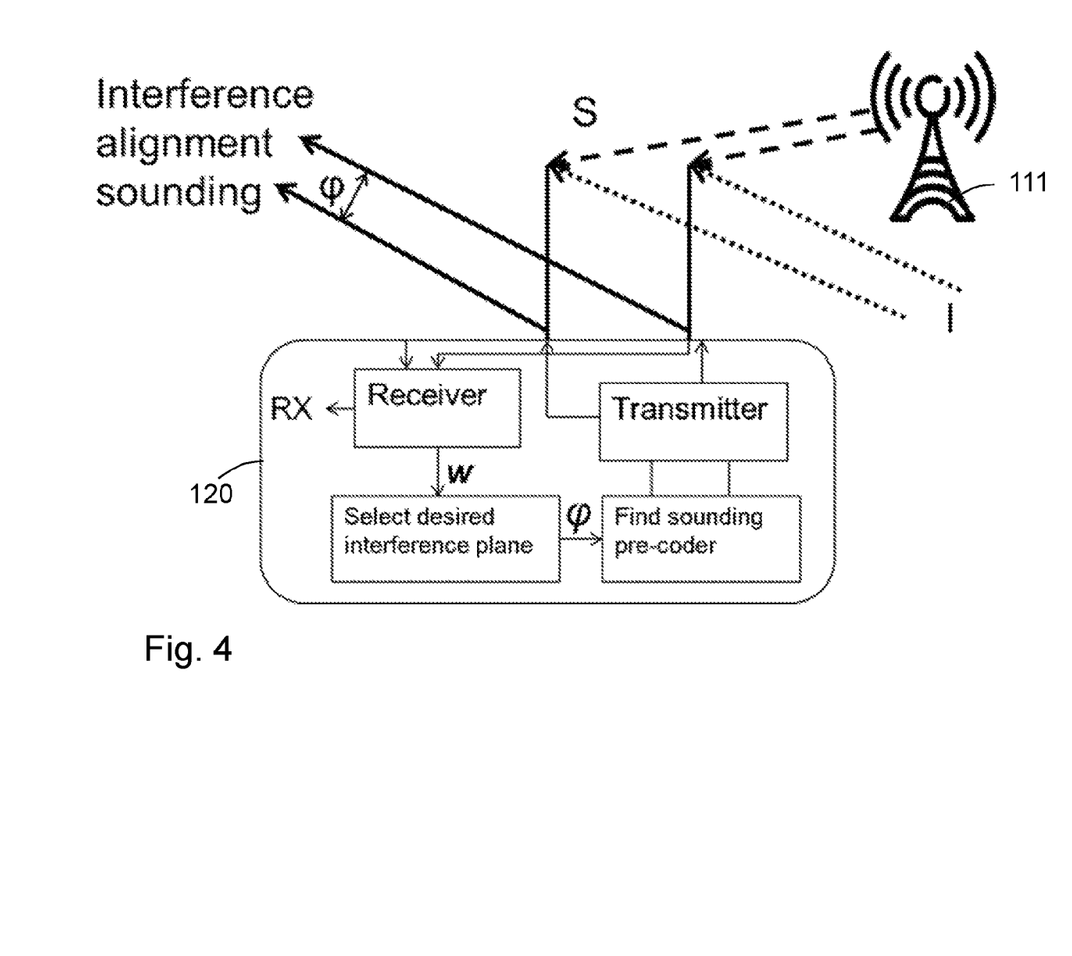
FIG. 4 is a schematic block diagram illustrating embodiments of a wireless communications network.

FIG. 4 depicts example embodiments related to the first wireless node 120 where the desired phase is related to radio conditions for reception of a transmission from the first radio node 111 at the first wireless node 120 in that it is a phase where interference at reception of signals from the first radio node 111 is acceptable to the first wireless node 120. As mentioned above, in these embodiments the interference is best mitigated and avoided for the first wireless node 120 in the desired phase. Therefore the first wireless node 120 prefers to receive as much as possible of interference in the selected desired phase denoted $\varphi$ in FIG. 4. As can be seen from FIG. 4 the first wireless node 120 comprises a receiver and a transmitter. In this example the first wireless node 120 is served by the first radio node 111 which is another radio node than the second radio node 112.

In an example scenario, the first wireless node 120 receives data by utilizing the receiver. By taking interference, referred to as dotted lines, and IRC into account, a good way of setting receiver weights, denoted w in FIG. 4, may be obtained. This relates to Action 201 above.

The receiver weights, and other receiver information, are used to select a desired phase $\varphi$ where interference is best mitigated and avoided. Also this relates to Action 201 above.

Pre-coder weights are then set to transmit in the selected phase cp. This relates to Action 202 above.

The reference signal, referred to as an interference alignment sounding in FIG. 4, is then transmitted with these pre-coders. The reference signal will be received by radio nodes within radio range of the wireless node 120 such as the second radio node 112, not shown in FIG. 4. This relates to Action 203 above. In this action the reference signal transmission may be turned on or off based on reception or based on scheduling information e.g. by only sending reference signals such as e.g. sounding when downlink data is going to be received. The sounding may be sent frequency selective based on frequency selective receiver weights and desired phases for different sub-bands.

Figure 5:
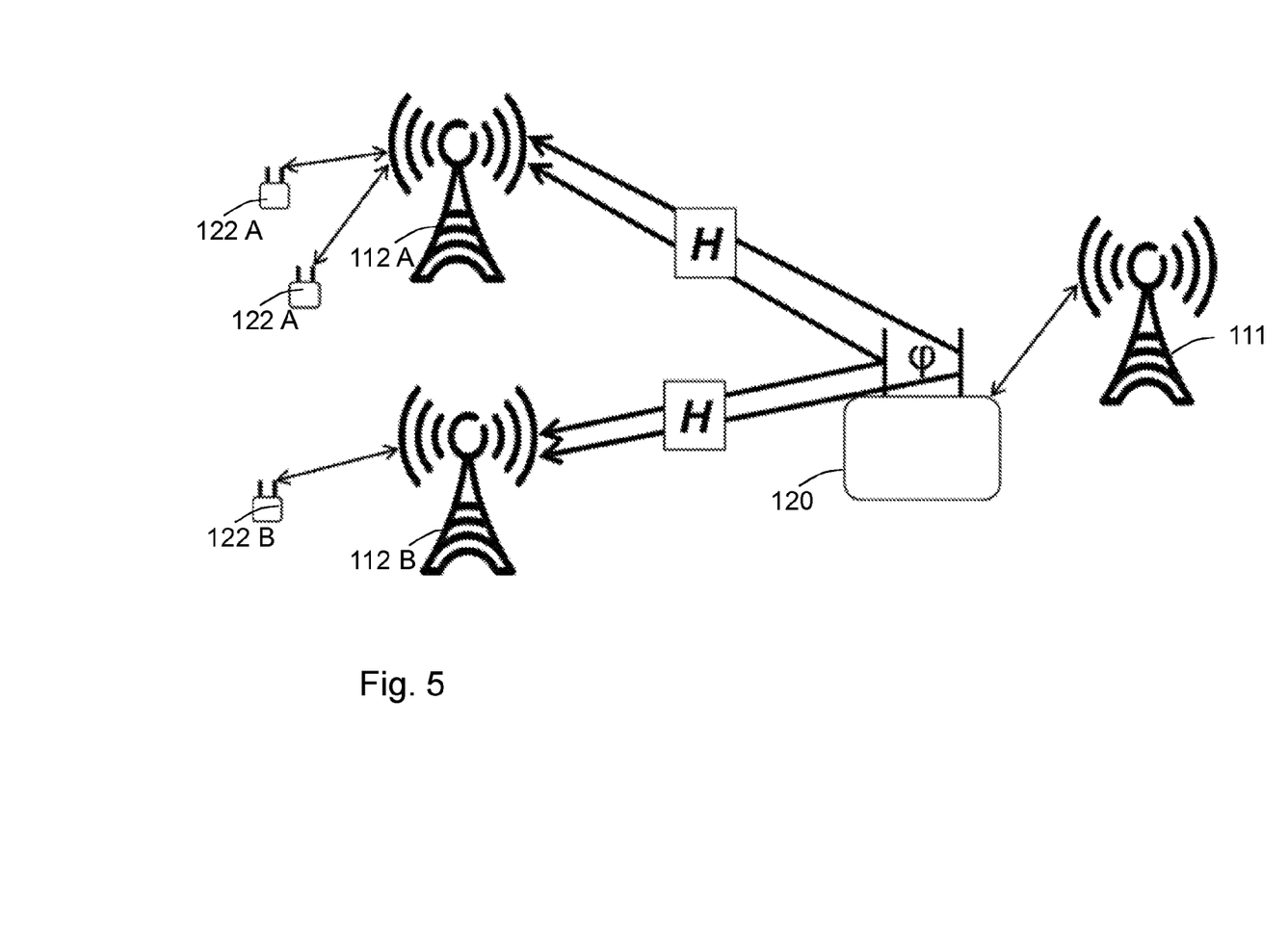
FIG. 5 is a schematic block diagram illustrating embodiments of a wireless communications network.

FIG. 5 depicts example embodiments related to the second radio node 112, where the desired phase is related to radio conditions for reception of a transmission from a first radio node 111 at the first wireless node 120 in that it is a phase where interference at reception of signals from the first radio node 111 is acceptable to the first wireless node 120. As mentioned above, in these embodiments the interference is best mitigated and avoided for the first wireless node 120 in the desired phase. Therefore the first wireless node 120 prefers to receive as much as possible of interference in the selected desired phase denoted $\varphi$ in FIG. 5. As in FIG. 4 the first wireless node 120 is another radio node than the second radio node 112. FIG. 5 shows two radio nodes, second radio node 112 A and second radio node 112 B, each serving respective one or more second wireless nodes 122 A and second wireless nodes 122 B.

In each of the second radio nodes 112 A and 112 B, the reference signal is distorted by the channel, denoted by H in FIG. 5. The reference signal may be received as the sum energy and phase for all wireless nodes e.g. including the first wireless node 120, transmitting the reference signal. The sum phase is the sum of desired phases of all wireless nodes e.g. including the first wireless node 120, separately distorted by the corresponding channel. This relates to Action 301 above.

The reference signal sent from the respective second wireless nodes 122 A and second wireless nodes 122 B, served by respective second radio node 112 A and second radio node 112 B, are subtracted from the received reference signal.

For any following downlink data transmission the precoder weights may be selected by weighting, e.g. by using MMSE or maximizing Signal to Interference plus Noise Ratio (SINR), between best data transmission to the respective second wireless nodes 122 A and second wireless nodes 122 B served by respective second radio nodes 112A and 112B, and sending interference in the phase causing least interference to surrounding wireless nodes, such as the first wireless node 120, in other cells. This relates to Action 302 above.

In this action 302 a scheduling selection may take place, scheduling wireless nodes causing least interference. For example frequency selective scheduling may be used to avoid transmission on resources where it is difficult to find a good precoder for transmission to any of the respective second wireless nodes 122 A and second wireless nodes 122 A, while at the same time avoiding to interfere the first wireless node 120.

The interference alignment sounding may also be improved by applying an uplink power control algorithm also on the reference signal. A reasonable power control algorithm will reflect the situation of the receiver of the first wireless node 120 so that the interference alignment reference signal also may be power controlled. When the first wireless node 120 is far away from the first radio node 111 it will use more power which also corresponds to weak signal received from the first radio node 111. This will then cause higher interference alignment sounding power indicating that it is more important with interference avoidance for the first wireless node 120 than for other wireless nodes in better positions. Thus the received signal strength of the reference signal in each radio node will well reflect the wireless nodes that the interference from a transmission has largest impact on.

According to embodiments herein the desired phase may be multi-dimensional. For example embodiments depicted in FIGS. 4 and 5 where the wireless nodes have two antennas the desired phase $\varphi$ is one-dimensional. For wireless nodes having three antennas the desired phase $\varphi$ is two-dimensional, and so on. Thus the described solution is applicable to any number of antennas.

The MRC receiver weights with two antennas are two complex values which maximize the reception amplitude constructively by adding the two antenna phases at reception. Then the phase $\varphi$ where the interference is not desired to use for transmitting the reference signal is the difference between the two complex values weight angles, which is to set pre-coder weights for the reference signal to the two complex MRC weights.

Correspondingly the received phase in the second radio node 112 may be multi-dimensional and dependent on number of antennas in the second radio node 112. The embodiments described herein may be applicable to radio nodes having any number of antennas. The more antennas the more freedom to avoid causing interference to wireless nodes such as the first wireless node 120.

Further, the more antennas that are available in the first wireless node 120 and in the second radio node 112, the more freedom is there in the selection of precoder weights.

If the second radio node 112 has only two antennas it may only measure one phase which also corresponds to its degree of freedom in choice of pre-coder weights to avoid interference towards the first wireless node 120.

Multiple reference signals may be implemented as multiple symbols in an Orthogonal Frequency Division Multiplexing (OFDM) time-frequency grid or as orthogonal codes.

One example where multiple reference signals may be used is when the first wireless node 120 receives several layers through single user Multiple In Multiple Out (MIMO). This e.g. means that in embodiments using MRC and rank 2, i.e. two layers, there may be one set of weights for each layer which results in two sets of pre-coder weights which may be transmitted as two reference signals on different OFDM symbols or on same symbols with different codes.

A reference symbol structure similar to LTE Sounding Reference Signals (SRS) for multi-layer may be used.

Figure 6:
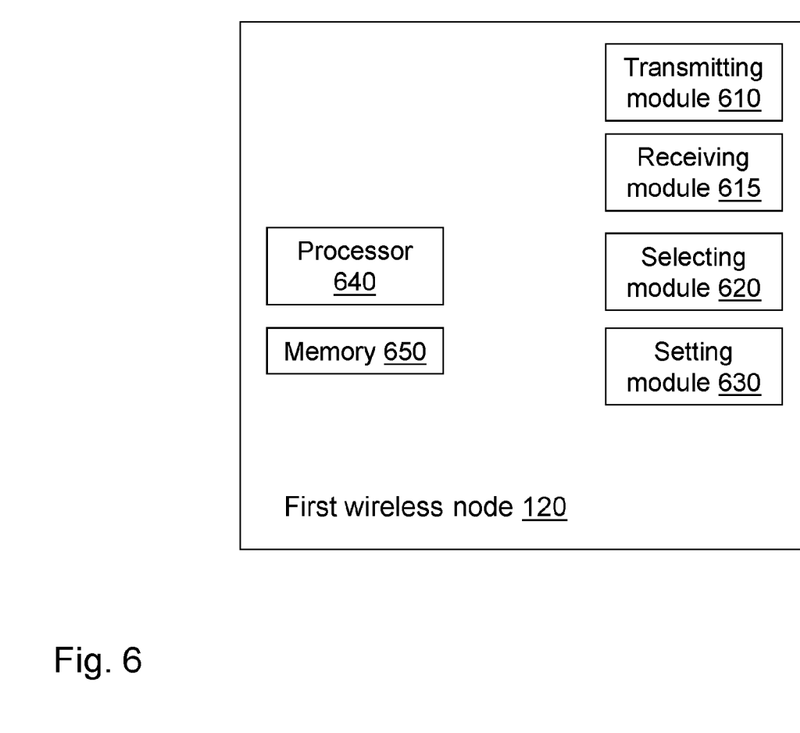
FIG. 6 is a schematic block diagram illustrating embodiments of a wireless node.

To perform the method actions for transmitting a reference signal, described above in relation to FIG. 2, the first wireless node 120 may comprise the following arrangement depicted in FIG. 6. As mentioned above, the first wireless node 120 is configured to operate in a wireless communications network 100.

The first wireless node 120 is configured to, e.g. by means of a transmitting module 610 being configured to, transmit a reference signal from at least two transmit antennas of the first wireless node 120. The reference signal is to be transmitted with a phase between the at least two transmit antennas indicating a desired phase related to radio conditions for reception of a transmission from a first radio node 111 at the first wireless node 120. The reference signal is to be received by one or more other radio nodes such as the second radio node 112 in the wireless communications network 100. The received reference signal is to be taken into account by the one or more other radio 30 nodes in the wireless communications network 100, e.g. when scheduling transmissions to other wireless nodes.

The transmitting module 610 may be comprised in a wireless transmitter in the first wireless node 120.

The first wireless node 120 may further be configured to, e.g. by means of transmitting module 610 being configured to, turn transmission of the reference signal on or off based on reception or based on scheduling information. The transmitting module 610 may further be configured to transmit the reference signal when data, e.g. downlink data, is to be received at the first wireless node 120.

In some embodiments, the first wireless node 120 may further be configured to, e.g. by means of transmitting module 610 being configured to, transmit the reference signal indicating multiple desired phases related to radio conditions for reception of a transmission from the first radio node 111 at the first wireless node 120.

The first wireless node 120 may further be configured to, e.g. by means of transmitting module 610 being configured to, adapt transmitted power of the reference signal to indicate importance of interference avoidance.

In some embodiments, at least one out of: An orthogonal code, a frequency and a transmission time slot of the reference signal may be specific to a cluster of cells comprising at least one cell 116 and common for wireless nodes 120 located in the cluster of cells. In some alternative embodiments, the orthogonal code, the frequency and the transmission time slot of the reference signal may be common for wireless nodes in the wireless communications network 100. The orthogonal code, the frequency and the transmission time slot of the reference signal may in some of these embodiments be common to all wireless nodes in the wireless communications network 100.

In some embodiments the desired phase comprises at least one phase that is related to radio conditions for reception of a transmission from the first radio node 111 at the first wireless node 120 in that it is a phase where interference at reception of signals from the first radio node 111 is acceptable to the first wireless node 120. Alternatively or additionally, the desired phase may comprise at least one phase that is related to radio conditions for reception of a transmission from the first radio node 111 at the first wireless node 120 in that it is a phase where the first wireless node 120 has a preferred signal reception phase that implicitly indicates a phase where interference at reception of signals from the first radio node 111 is acceptable to the first wireless node 120.

Note that the first wireless node 120 may also comprise a receiving module 615 for receiving signals and data. The receiving module 615 may be comprised in a wireless receiver in the first wireless node 120.

The first wireless node 120 may further be configured to, e.g. by means of a selecting module 620 being configured to select the desired phase based on a receiver configuration determined for the first wireless node 120.

The first wireless node 120 may further be configured to, e.g. by means of selecting module 620 being configured to, select the desired phase further based on a capability for interference cancellation of the receiver of the first wireless node 120.

The first wireless node 120, may further be configured to, e.g. by means of a setting module 630 being configured to set pre-coder weights in accordance with the desired phase.

In some embodiments the first wireless node 120 may further be configured to, e.g. by means of the setting module 630 being configured to set pre-coder weights in accordance with the desired phase by setting the precoder weights to scaled versions of Maximum Ratio Combining, MRC, receiver weights.

Figure 7:
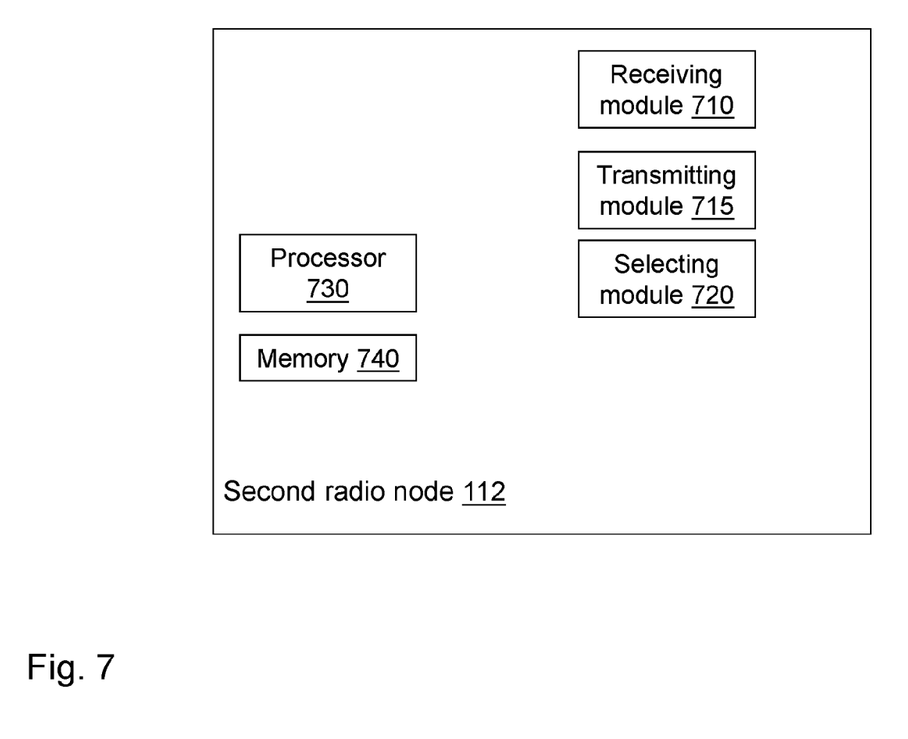
FIG. 7 is a schematic block diagram illustrating embodiments of a radio node.

To perform the method actions for receiving a reference signal from a first wireless node 120, described above in relation to FIG. 3, the second radio node 112 may comprise the following arrangement depicted in FIG. 7. As mentioned above, the second radio node 112 is configured to operate in the wireless communications network 100.

The second radio node 112 is configured to, e.g. by means of a receiving module 710 being configured to, receive in at least two receive antennas of the second radio node 112, a reference signal from a first wireless node 120. The reference signal has a phase indicating a desired phase related to radio conditions for reception of a transmission from a first radio node 111 at the first wireless node 120. The received phase, i.e. the phase of the received reference signal, may be taken into account by the second radio node 112 when scheduling transmissions to other wireless nodes in the wireless communications network 100.

The receiving module 710 may be comprised in a wireless receiver in the second radio node 112.

In some embodiments the desired phase comprises at least one phase that is related to radio conditions for reception of a transmission from a first radio node 111 at the first wireless node 120 in that it is a phase where interference at reception of signals from the first radio node 111 is acceptable to the first wireless node 120. Alternatively or additionally, the desired phase may comprise at least one phase that is related to radio conditions for reception of a transmission from the first radio node 111 at the first wireless node 120 in that it is a phase where the first wireless node 120 has a preferred signal reception phase that implicitly indicates a phase where interference at reception of signals from the first radio node 111 is acceptable to the first wireless node 120.

In some embodiments at least one out of: An orthogonal code, a frequency and a transmission time slot of the reference signal may be specific to a cluster of cells comprising at least one cell, e.g. cell 116, and common for wireless nodes located in the cluster of cells. In these embodiments, the second radio node 112 may be configured to, e.g. by means of the receiving module 710 being configured to, receive a sum of reference signals from wireless nodes transmitting the reference signal in the cluster of cells.

In some alternative embodiments, the orthogonal code, the frequency and the transmission time slot of the reference signal may be common for wireless nodes in the wireless communications network 100. In these embodiments, the second radio node 112 may be configured to, e.g. by means of the receiving module 710 being configured to, receive a sum of reference signals from wireless nodes transmitting the reference signal in the wireless communications network 100. The orthogonal code, the frequency and the transmission time slot of the reference signal may in some of these embodiments be common to all wireless nodes in the wireless communications network 100.

The second radio node 112 may further be configured to, e.g. by means of the receiving module 710 being configured to, exclude or subtract reference signals received from wireless nodes, e.g. second wireless node 122, connected to the second radio node 112 from the received sum of reference signals by excluding at least one out of: the orthogonal code, the frequency or the transmission time slot for the cell 117 or by subtracting known transmissions of the reference signal from the wireless nodes in the cell 117.

In some embodiments the received power of the reference signal is adapted to indicate an importance of interference avoidance.

Note that the second radio node 112 may also comprise a transmitting module 715 for transmitting signals and data. The transmitting module 715 may be comprised in a wireless transmitter of the second radio node 112.

The second radio node 112 may further be configured to, e.g. by means of a selecting module 720 being configured to, select pre-coder weights for a data transmission to a second wireless node 122 based on the phase of the received reference signal. The second radio node 112 may further be configured to, e.g. by means of the selecting module 720 being configured to, select pre-coder weights for the data transmission to the second wireless node 122, based on the phase of the received reference signal by being configured to perform a weighting between:

selecting pre-coder weights according to reception conditions for the data transmission to the second wireless node 122, and
 selecting pre-coder weights based on the phase of the received reference signal, thereby causing less interference to the first wireless node 120.

The second radio node 112 may further be configured to, e.g. by means of the selecting module 720 being configured to, select pre-coder weights for the data transmission to the second wireless node 122 based on the phase of the received reference signal by selecting pre-coder weights equal to receive weights selected for receiving a signal from the second wireless node 122 including interference cancellation.

The embodiments herein comprising the process of transmitting a reference signal, performed by the first wireless node 120 described above in relation to FIG. 2, and the process of receiving a reference signal from a first wireless node 120, which method is performed by the second radio node 112 described above in relation to FIG. 3, may be implemented through one or more processors, such as a processor 640 in the first wireless node 120 depicted in FIG. 6 and as a processor 730 in the second radio node 112 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the second radio node 112. One such carrier may be in the form of a CD ROM disc. It is however also feasible with other data carriers such as a memory stick. The computer program code may furthermore be provided as program code on a server, downloaded to the first wireless node 120 and downloaded to the second radio node 112.

The first wireless node 120 may further comprise a memory 650 comprising one or more memory units, and the second radio node 112 may further comprise a memory 740 comprising one or more memory units. The memory 650 comprises instructions executable by the processor 640 and the memory 740 comprises instructions executable by the processor 730.

The memory 650 and the memory 740 are arranged to be used to store e.g. the desired and/or received phase, the orthogonal code, the frequency and the transmission time slot of the reference signal, pre-coder weights, data, configurations, and applications to perform the methods herein when being executed in the first wireless node 120 and the second radio node 112.

Those skilled in the art will also appreciate that the transmitting module 610, selecting module 620, setting module 630, receiving module 710, and selecting module 720, described above may refer to a combination of analog and digital circuits, and/or one or more processors configured with software and/or firmware, e.g. stored in the memory 650 and the memory 740, that when executed by the one or more processors, such as the processor 640 performs and/or the processor 730, performs as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

The invention claimed is:

1. A method, performed in a first wireless node, for transmitting a reference signal, wherein the first wireless node operates in a wireless communications network, the method comprising:
turning transmission of the reference signal on or off based on reception or scheduling information; and
when the transmission of the reference signal is on and when data is to be received at the first wireless node, transmitting the reference signal, wherein the reference signal is transmitted from at least two transmit antennas of the first wireless node, wherein the reference signal is transmitted with a phase between the at least two transmit antennas indicating a desired phase related to radio conditions for reception of a transmission, from a first radio node, at the first wireless node, and wherein the reference signal is to be received and taken into account by at least one other radio node in the wireless communications network.

2. A method, performed in a second radio node, for receiving a reference signal from a first wireless node, wherein the second radio node operates in a wireless communications network, the method comprising:
receiving, in at least two receive antennas of the second radio node, the reference signal from the first wireless node, wherein the received reference signal has a phase indicating a desired phase related to radio conditions for reception of a transmission, from a first radio node, at the first wireless node; and
selecting, based on the phase of the received reference signal, pre-coder weights for data transmission to a second wireless node.

3. A first wireless node configured to operate in a wireless communications network, the first wireless node comprising a transmitter, wherein the transmitter is configured to:
turn transmission of a reference signal on or off based on reception or scheduling information; and
when the transmission of the reference signal is on and when data is to be received at the first wireless node, transmit the reference signal, wherein the reference signal is transmitted from at least two transmit antennas of the first wireless node, wherein the reference signal is transmitted with a phase between the at least two transmit antennas indicating a desired phase related to radio conditions for reception of a transmission, from a first radio node, at the first wireless node, and wherein the reference signal is to be received and taken into account by at least one other radio node in the wireless communications network.

4. The first wireless node according to claim 3, wherein the desired phase comprises at least one phase that is related to the radio conditions for the reception of the transmission, from the first radio node, at the first wireless node, and wherein an interference at reception of signals from the first radio node, at the desired phase, is acceptable to the first wireless node.

5. The first wireless node according to claim 3, wherein the desired phase comprises at least one phase that is related to the radio conditions for the reception of the transmission, from the first radio node, at the first wireless node, wherein the desired phase corresponds to a preferred signal reception phase, and wherein an interference at reception of signals from the first radio node, at the desired phase, is acceptable to the first wireless node.

6. The first wireless node according to claim 3, wherein the first wireless node is configured to select the desired phase based on a receiver configuration determined for the first wireless node.

7. The first wireless node according to claim 6, wherein the first wireless node is configured to select the desired phase further based on a capability for interference cancellation of a receiver of the first wireless node.

8. The first wireless node according to claim 3, wherein the first wireless node is configured to set pre-coder weights in accordance with the desired phase.

9. The first wireless node according to claim 8, wherein the first wireless node is configured to set the pre-coder weights in accordance with the desired phase by setting the pre-coder weights to scaled versions of Maximum Ratio Combining (MRC) receiver weights.

10. The first wireless node according to claim 3, wherein at least one out of: an orthogonal code, a frequency, and a transmission time slot of the reference signal, is specific to a cluster of cells comprising at least one cell, and wherein the at least one out of: the orthogonal code, the frequency, and the transmission time slot of the reference signal is common for wireless nodes located in the cluster of cells.

11. The first wireless node according to claim 3, wherein an orthogonal code, a frequency, and a transmission time slot of the reference signal are common for wireless nodes in the wireless communications network.

12. The first wireless node according to claim 3, wherein the transmitter is further configured to transmit the reference signal indicating multiple desired phases related to the radio conditions for the reception of the transmission, from the first radio node, at the first wireless node.

13. The first wireless node according to claim 3, wherein the first wireless node is configured to adapt a transmitted power of the reference signal to indicate importance of interference avoidance.

14. A second radio node configured to operate in a wireless communications network, the second radio node comprising a receiver, wherein the receiver is configured to:
receive, in at least two receive antennas of the second radio node, a reference signal from a first wireless node, wherein the received reference signal has a phase indicating a desired phase related to radio conditions for reception of a transmission, from a first radio node, at the first wireless node; and select, based on the phase of the received reference signal, pre-coder weights for data transmission to a second wireless node.

15. The second radio node according to claim 14, wherein the desired phase comprises at least one phase that is related to the radio conditions for the reception of the transmission, from the first radio node, at the first wireless node, and wherein an interference at reception of signals from the first radio node, at the desired phase, is acceptable to the first wireless node.

16. The second radio node according to claim 14, wherein the desired phase comprises at least one phase that is related to the radio conditions for the reception of the transmission, from the first radio node, at the first wireless node, wherein the desired phase corresponds to a preferred signal reception phase, and wherein an interference at reception of signals from the first radio node, at the desired phase, is acceptable to the first wireless node.

17. The second radio node according to claim 14, wherein, to select the pre-coder weights, the second radio node is configured to perform a weighting between:

selection of the pre-coder weights according to reception conditions for the data transmission to the second wireless node; and selection of the pre-coder weights based on the phase of the received reference signal, thereby causing less interference to the first wireless node.

18. The second radio node according to claim 17, wherein the second radio node is configured to select the pre-coder weights for the data transmission to the second wireless node based on the phase of the received reference signal by selecting the pre-coder weights equal to receive weights selected for receiving a signal from the second wireless node including interference cancellation.

19. The second radio node according to claim 14, wherein at least one out of: an orthogonal code, a frequency, and a transmission time slot of the reference signal, is specific to a cluster of cells comprising at least one cell, wherein the at least one out of: the orthogonal code, the frequency, and the transmission time slot of the reference signal, is common for wireless nodes located in the cluster of cells, and wherein the second radio node is further configured to receive a sum of reference signals from wireless nodes, of the wireless nodes located in the cluster of cells, transmitting the reference signal in the cluster of cells.

20. The second radio node according to claim 19, wherein the receiver is further configured to exclude or subtract the reference signals received from the wireless nodes, connected to the second radio node, from the received sum of reference signals by one of:

excluding at least one out of: the orthogonal code, the frequency, and the transmission time slot of the reference signal for a cell; and subtracting known transmissions of the reference signal from the wireless nodes in the cell.

21. The second radio node according to claim 14, wherein an orthogonal code, a frequency, and a transmission time slot of the reference signal are common to wireless nodes in the wireless communications network, wherein the second radio node is further configured to receive a sum of reference signals from the wireless nodes transmitting the reference signal in the wireless communications network, and wherein the wireless nodes include the first wireless node.

22. The second radio node according to claim 14, wherein received power of the reference signal indicates an importance of interference avoidance.

* * * * *